July 7, 1959    C. S. LYON    2,893,765
EXTENSIBLE TORQUE ROD
Filed Aug. 18, 1955
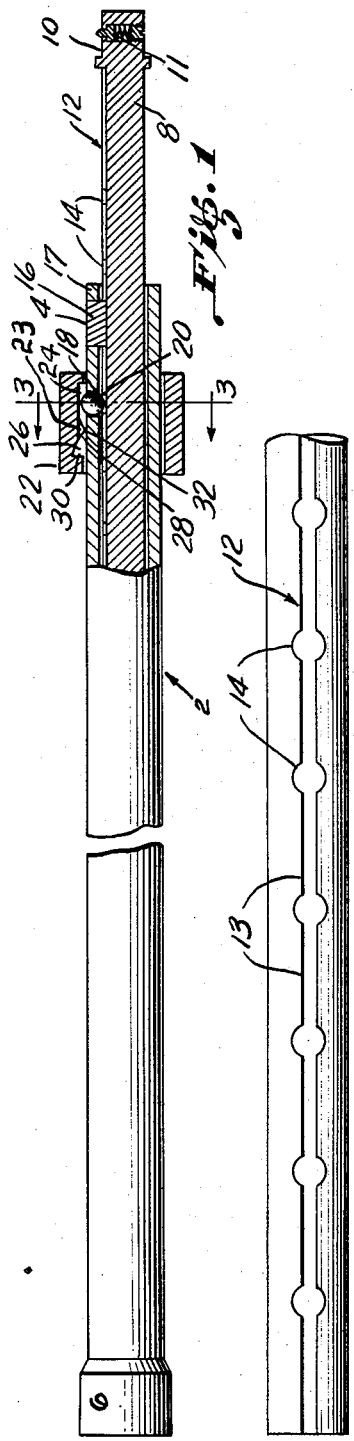
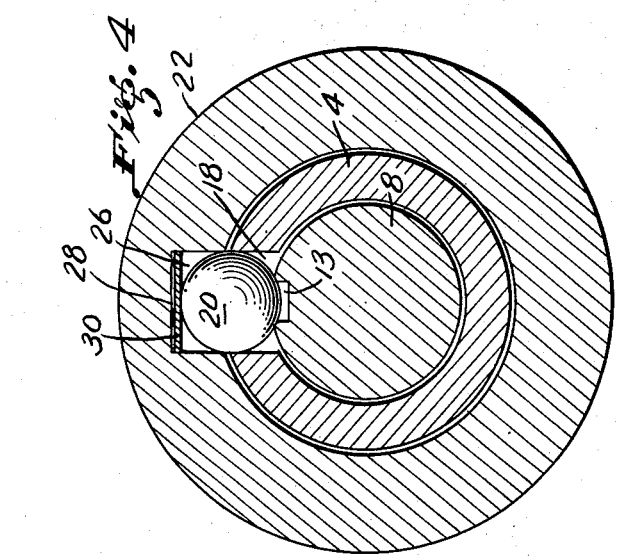
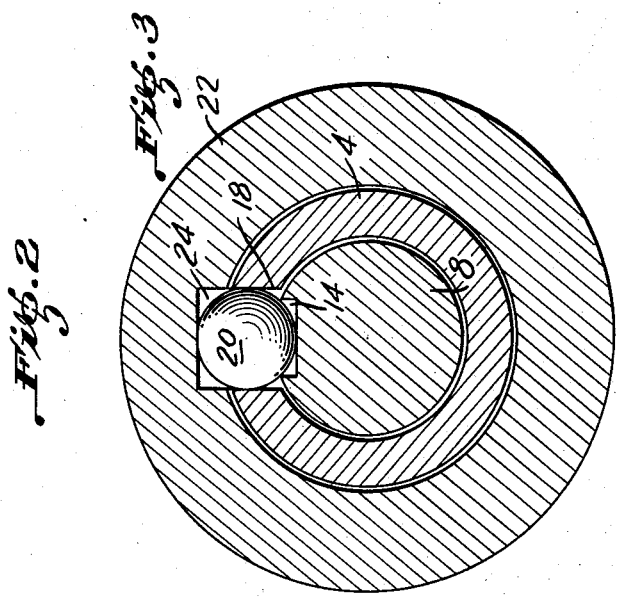
INVENTOR
CHESTER S. LYON
BY James H. Littlepage
ATTORNEY

United States Patent Office 2,893,765
Patented July 7, 1959

2,893,765

EXTENSIBLE TORQUE ROD

Chester S. Lyon, Boise, Idaho

Application August 18, 1955, Serial No. 529,238

3 Claims. (Cl. 287—58)

This invention relates to rod joints and couplings and, more particularly, to a telescopically adjustable torque rod.

The object of this invention is to provide a torque rod of the type generally, although not exclusively, used for socket wrench extensions and, particularly, to provide for adjustably extending the rod to any one of a series of selected lengths. According to this invention it is intended to provide telescoping rod sections keyed against relative rotations, and an axially sliding collar ball lock for quickly and easily holding the sections in selected lengthwise adjustment.

Particular objects of the invention are the provision of a lengthwise keyway on a rod sliding in a tube, the keyway having a series of enlargements along its length providing ball sockets, a detent ball fitting through an opening in the tube, and a locking collar having an extremely simple but effective snap motion for engaging the ball in or releasing it from locking relationship with the keyway enlargements. The objects are also that the mechanism be inexpensive and simple to manufacture and assemble, and that it will be definite in its operation so that the operator can tell that the lengthwise adjustment is locked by both sight and feel. These objectives, it will be seen hereinbelow, are obtained without resorting to undue weight and size of the assembly, in a structure which can be instantly adjusted and positively locked without danger of accidental release.

Other objects will be apparent from the following specification and drawings, in which:

Fig. 1 is a side elevation of the extensible torque rod, broken away to show the novel parts in section;

Fig. 2 is a plan view of the inner rod, showing the keyway.

Fig. 3 is cross section along the line 3—3 of Fig. 1 showing the parts locked against telescopic movement; and, Fig. 4 is a cross section similar to Fig. 3 but showing the parts when arranged for telescopic movement.

Referring now to the drawing, in which like reference numerals denote similar elements, the extensible torque rod 2 comprises a sleeve 4 having a socket 6 at its free end for receiving the mating head of a driving member (not shown). Telescopically engaged within sleeve 4 is an extensible rod 8 having on its free end a driving head 10 adapted to snap into a tool socket, wherein it is releasably held by a replaceable spring biased detent 11.

As illustrated best in Fig. 2, rod 8 has a longitudinal keyway 12 interspersed throughout its length with enlargements, i.e., ball sockets 14. A key 16, rigidly affixed in a slot 17 in sleeve 4, slidably engages in keyway 12 so as to prevent relative rotation between the sleeve and the rod at all times. Thus, no matter whether it be locked or unlocked in lengthwise adjustment, torque rod 2 is capable of transmitting strong twisting forces from a driving member to a tool.

Fitting through a circular opening 18 in sleeve 4 is a detent ball 20, and surrounding the assembly an axially slidable collar 22 is formed on its inner side with a recess 23 having contiguous shallow and deep portions 24 and 26 respectively. A flat spring 28 secured as at 30 in the top of the deep portion 26 of recess 23 inclines downwardly to an inverted hump 32, this providing the snap action detailed below.

In operation, when lengthwise adjustment of torsion rod 2 is desired, collar 22 is slid axially to the right from the position shown in Fig. 1 so that hump 32 of flat spring 34 snaps over ball 20. When rod 8 is moved in one axial direction or the other from a locked position as shown in Fig. 1, the edges of ball sockets 14 cam ball 20 upwardly into the deep portion 26 of recess 23, and the ball then rolls smoothly on the edges of the straight portion 13 of longitudinal keyway 12, as shown in Fig. 4. As rod 8 is extended or retracted, the barrier provided by spring hump 32 prevents accidental displacement of collar 22 so that it thus remains in unlocking position until deliberately moved, and the slight bias exerted by spring 28 against the ball causes it to seat momentarily in sockets 14 as they pass, so that the locking positions can be felt until a selected one is reached. Then, when collar 22 is returned to its Fig. 1 position, spring hump 32 snaps over ball 20 to lock the parts together as shown in Fig. 3. Since the weight of the shallow portion 24 of recess 23 is not sufficient to permit ball 20 to ride up on the edges of the straight portions 13 of keyway 12, the ball remains seated in a socket 14 and the rod and sleeve are locked against lengthwise movement. In this position, collar 22 is prevented from accidental ball-releasing movement because of the yieldable block provided by spring hump 32.

The invention described above is not limited to the specific details of the illustrated elements, but is intended to cover all substitutions, modifications and equivalents within the scope of the following claims.

I claim:

1. An extensible torsion rod comprising a sleeve, a rod telescopingly fitting in said sleeve, a keyway extending lengthwise on the exterior of the rod and comprising relatively narrow portions interspersed with relatively wide portions constituting ball sockets, an opening through the wall of said sleeve, a ball fitting in said opening, said ball being substantially larger in diameter than the width of the narrow keyway portions, a collar on the exterior of said sleeve surrounding the ball, said collar having a recess in the inner side thereof for accommodating said ball and comprising contiguous shallow and deep portions, said collar being slidable on said sleeve so as selectively to dispose the shallow and deep portions of the recess over said ball, the height of the deep portion being such as to permit said ball to ride up on the edges of the narrow keyway portions, the height of the shallow portion being such as to lock said ball in a ball socket, and a key affixed in said sleeve, said key slidably engaging in said keyway for preventing relative rotation between the sleeve and rod.

2. The combination claimed in claim 1, and a spring affixed in said recess between the shallow and deep portions thereof, said spring having a bent portion providing a yieldable barrier between said shallow and deep portions, whereby to provide a snap action in the sliding movement of said sleeve and yieldably retaining the sleeve in selected position.

3. An extensible torsion rod comprising a sleeve, a rod telescopingly fitting in said sleeve, a keyway extending lengthwise on the exterior of the rod and comprising relatively narrow portions interspersed with relatively wide portions constituting ball sockets, an opening through the wall of said sleeve, a ball fitting in said opening, said ball being substantially larger in diameter than the width of the narrow keyway portions, a collar on the exterior of said sleeve, said collar having an axially elongate recess in the inner side thereof for accommodating said ball and comprising contiguous shallow and deep portions, said collar being slidable axially on said sleeve so as selectively to dispose the shallow and deep portions of the recess over said ball, the height of the deep portion being such as to permit said ball to ride up on the edges of the narrow keyway portions, the height of the shallow portion being such as to lock said ball in a ball socket, and a flat spring having one end affixed in the top of one of the portions of the recess, said spring extending downwardly towards the other recess portion and having a downwardly disposed hump at the juncture of said portions.

References Cited in the file of this patent

UNITED STATES PATENTS

| | | |
|---|---|---|
| 425,787 | Hartshorn | Apr. 15, 1890 |
| 2,289,818 | Winner et al. | July 14, 1942 |
| 2,521,701 | Earle et al. | Sept. 12, 1950 |
| 2,705,119 | Ingwer | Mar. 29, 1955 |
| 2,752,218 | Shea | June 26, 1956 |